UNITED STATES PATENT OFFICE.

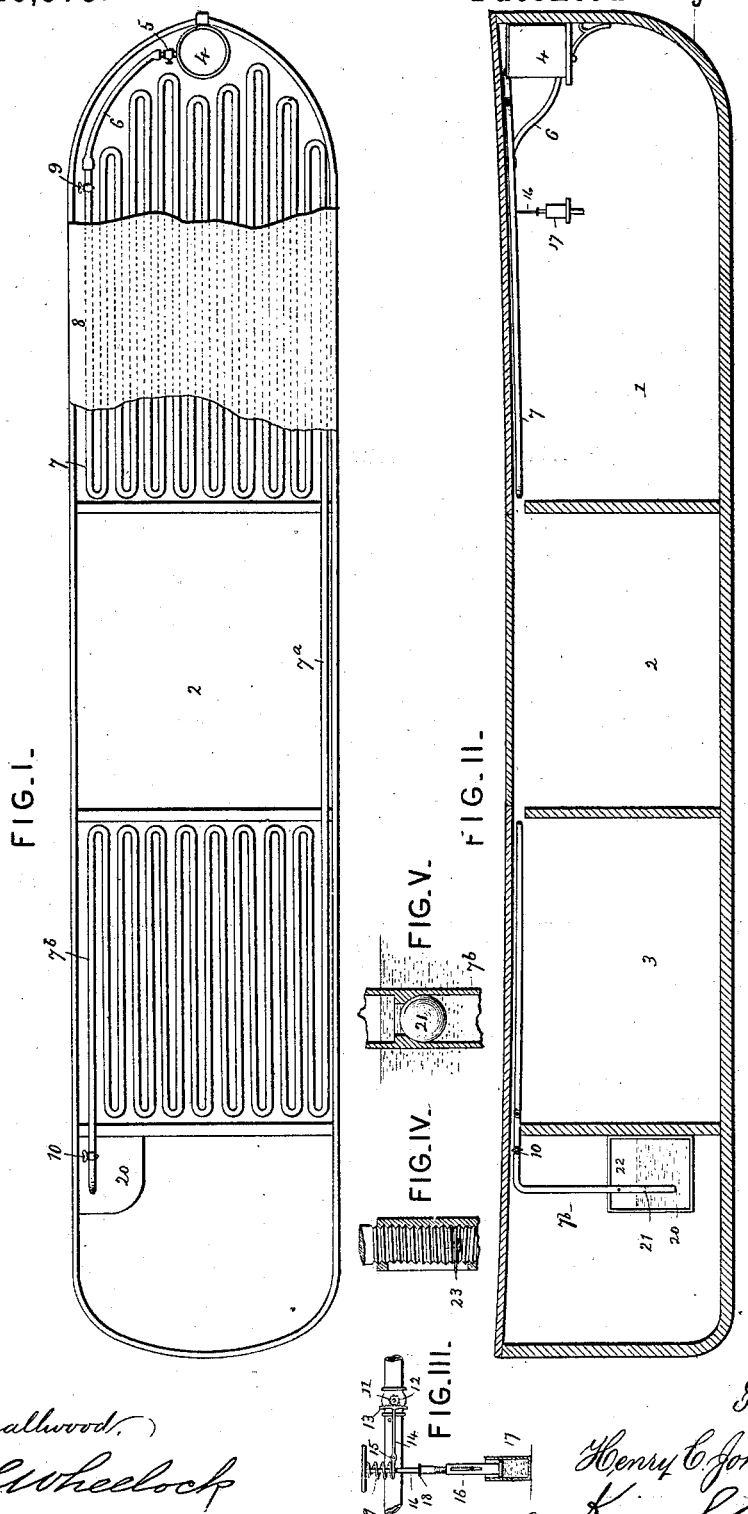

HENRY C. JOHNSON, OF MEADVILLE, PENNSYLVANIA.

REFRIGERATING APPARATUS FOR THE TRANSPORTATION OF MEAT, &c.

SPECIFICATION forming part of Letters Patent No. 316,975, dated May 5, 1885.

Application filed April 6, 1885. (No model.)

*To all whom it may concern:*

Be it known that I, HENRY CLAY JOHNSON, a citizen of the United States, residing at Meadville, in the county of Crawford and State of Pennsylvania, have invented a new and useful Improvement in Refrigerating Apparatus for the Storage and Transportation of Meat, Fruit, and other Perishable Articles, of which the following is a specification.

My invention relates to apparatus for the storage or transportation of grain, meat, fruits, or other perishable articles in warehouses, elevators, boats, vessels of all kinds, or railway-cars or other conveyances.

The invention consists in the provision of detachable holders or receivers for containing anhydrous ammonia or other cooling agent compressed into liquid form, placed in communication, when desired, with a coil or other suitable cooling-conduit, which terminates in a water-tank, for taking up the ammonia and holding it for future use, a check-valve being provided at the outlet of the cooling-conduit, to prevent the influx of water by atmospheric pressure to fill the vacuum formed in the conduit by the condensation of the gas. I also provide above the surface of the water, near the discharge end of the cooling-pipe, an aperture communicating with the atmosphere, to reduce the force of the suction, and to co-operate with the check-valve to prevent the forcing of water into the pipe by atmospheric pressure.

In the accompanying drawings, Figure I is a plan or top view of a canal-boat with my invention applied, portions of the deck being removed to expose the cooling appliances. Fig. II is a vertical longitudinal section of the same. Fig. III is an elevation, partly in section, of a thermal regulator on a larger scale. Fig. IV is a vertical section of a portion of the said regulator on a still larger scale. Fig. V is a detail sectional view on a larger scale, representing the check-valve and air-duct at the discharge end of the conduit.

In applying the invention to canal-boats, the boat may be made with a hold in any desirable number of compartments—1 2 3, for example—the central compartment, 2, being here represented as open at top for the reception of the hatch for loading and unloading. A removable receiver, 4, contains anhydrous ammonia condensed into liquid form by pressure and confined therein by a stop-cock, 5. This removable receiver 4 communicates through a hose, 6, with one end of a cooling-conduit, 7, which is preferably formed of a coiled pipe extending in any number of convolutions directly underneath the deck 8 of the compartment 1, then extending by a conducting pipe or section, 7$^a$, across the compartment 2 to the compartment 3, where it is formed in another series of convolutions, 7$^b$, beneath the deck at top of the said compartment 3. The cooling-conduit 7 7$^a$ 7$^b$ is provided with stop-cocks 9 10 at its respective ends, by which the cooling-gas may be imprisoned in said conduit when desired, or its flow therethrough regulated. It is also provided with a thermal regulator, consisting of a dial-cock, 11, operated by a pinion, 12, and segment-gear 13, the latter mounted on the long arm of a lever, 14, fulcrumed at 15, and actuated through its shorter arm by a piston-rod, 16, adjustable in length and pressed upward by the expansion of mercury in the cylinder 17. The lower member, 16$^a$, of the piston-rod is made hollow and provided with an internal screw-thread, to receive an external thread on the rod 16, which is rotated by a thumb-collar, 18, to lengthen or shorten the rod, thus causing it to act with a greater or less effect upon the valve 11 under a given expansion of the mercury in cylinder 17. A strong spring, 19, moves the lever 14 in the opposite direction as the mercury in the cylinder 17 contracts. By these means I am enabled to set the regulating apparatus so as to maintain a flow of cooling-gas through the conduit, regulated by the temperature of the apartment to be cooled, as I have more particularly described and claimed in another application of even date herewith. The pipe 7$^b$ terminates in a tank, 20, containing water, into which the ammonia is passed as it flows through the cooling-conduit.

In order to prevent the influx of water into the cooling-pipe, I provide at the discharge end of said pipe an automatic check-valve, 21, (shown in detail in Fig. V,) and also an aperture, 22, in the pipe 7<sup>b</sup> above the level of the water in the tank 20. The effect of the aperture 22 permitting a slight influx of air into the cooling-conduit 7<sup>b</sup> is to somewhat modify the force of the exhaust produced in the cooling-conduit by the condensation of the gas from contact with the water, and also to lessen the liability of even a slight influx of water into the conduit from the tank 20 before the check-valve 21 has time to act. A pointer, 23, swiveled to the extremity of the adjustable piston-rod enables the thermal regulator to be set to any temperature desired.

Having thus described my invention, the following is what I claim as new therein and desire to secure by Letters Patent:

1. A refrigerating or cooling apparatus consisting of one or more receivers or gas-holders, 4, a water-tank, 20, for receiving the gas for future use, and a cooling-conduit, 7 7<sup>a</sup> 7<sup>b</sup>, of any suitable form, extending from the receiver or gas-holder 4 to the tank 20, provided at its respective ends with stop-cocks 9 10, and at its outlet with a check-valve, 21, to prevent the influx of water from the tank.

2. The combination of cooling-conduit 7<sup>b</sup>, water-tank 20, check-valve 21, and an aperture, 22, in the cooling-conduit above the level of the water in the tank, as and for the purposes set forth.

HENRY C. JOHNSON.

Witnesses:
HENRY A. LOCKWOOD,
ALBERT MILLER.